United States Patent
Bagaini et al.

(10) Patent No.: US 7,974,154 B2
(45) Date of Patent: Jul. 5, 2011

(54) VIBROSEIS CALIBRATION TECHNIQUE AND SYSTEM

(75) Inventors: Claudio Bagaini, Cottenham (GB); John Quigley, Redhill (GB); Robert Vincent, Nairn (GB)

(73) Assignee: WesternGeco L.L.C., Houston, TX (US)

( * ) Notice: Subject to any disclaimer, the term of this patent is extended or adjusted under 35 U.S.C. 154(b) by 573 days.

(21) Appl. No.: 12/053,153

(22) Filed: Mar. 21, 2008

(65) Prior Publication Data
US 2009/0238038 A1    Sep. 24, 2009

(51) Int. Cl.
*G01V 1/04*  (2006.01)
(52) U.S. Cl. ....................................... 367/190
(58) Field of Classification Search .................. 367/189, 367/190
See application file for complete search history.

(56) References Cited

U.S. PATENT DOCUMENTS

| | | | | |
|---|---|---|---|---|
| 3,815,704 | A | * | 6/1974 | Eisner ........................... 367/189 |
| 4,692,912 | A | * | 9/1987 | Mueller et al. ................ 367/190 |
| 4,907,670 | A | | 3/1990 | Anstey |
| 6,035,257 | A | | 3/2000 | Epperson |
| 2007/0133354 | A1 | | 6/2007 | Bagaini et al. |
| 2007/0242563 | A1 | | 10/2007 | Kamata |
| 2009/0116337 | A1 | * | 5/2009 | Chiu et al. ....................... 367/41 |

OTHER PUBLICATIONS

PCT Search Report, dated Oct. 27, 2009, Application No. PCT/US2009/037786.

* cited by examiner

*Primary Examiner* — Jack Keith
*Assistant Examiner* — Krystine Breier

(57) ABSTRACT

A technique includes operating a seismic vibrator, including driving the seismic vibrator at different frequencies and driving forces. The technique includes monitoring a parameter affected by the operation of the seismic vibrator during the frequency sweep and based at least in part on the monitored parameter, determining a maximum driving force profile for the seismic vibrator.

16 Claims, 7 Drawing Sheets

VIBROSEIS CALIBRATION TECHNIQUE AND SYSTEM

BACKGROUND

The invention generally relates to a vibroscis calibration technique and system.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes operating a seismic vibrator, including driving the seismic vibrator at different frequencies and driving forces. The technique includes monitoring a parameter affected by the operation of the seismic vibrator during the frequency sweep and based at least in part on the monitored parameter, determining a maximum driving force profile for the seismic vibrator.

In another embodiment of the invention, a system includes a seismic vibrator and a controller. The controller is adapted to cause the seismic vibrator to operate at different frequencies and driving forces to generate calibration data, which identifies a maximum driving force profile for the seismic vibrator. The controller is adapted to cause the seismic vibrator to operate pursuant to a second sweep, whose drive force is derived from the calibration data in connection with a vibroseis acquisition.

In yet another embodiment of the invention, an article includes a computer readable storage medium to store instructions that when executed by a processor-based system cause the processor-based system to receive data indicative of a parameter affected by operation of a seismic vibrator in response to the seismic vibrator being driven at different frequencies and driving forces. The instructions when executed cause the processor-based system to process the data to determine a maximum driving force profile for the seismic vibrator based at least in part on the data.

Advantages and other features of the invention will become apparent from the following drawing, description and claims.

DETAILED DESCRIPTION

Figure 1:
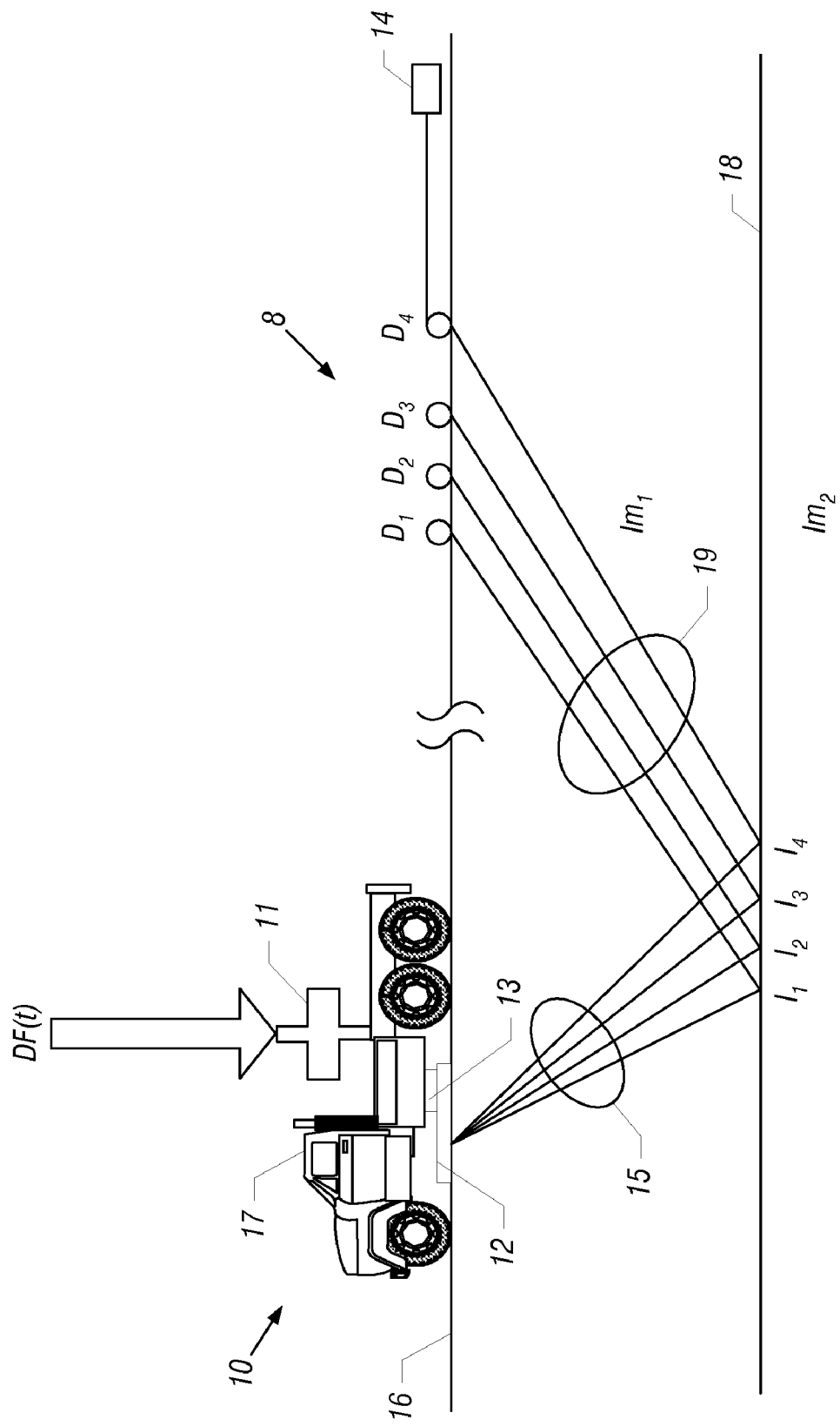
FIG. 1 is a schematic diagram of a vibroseis acquisition system according to an embodiment of the invention.

Referring to FIG. 1, a land-based vibroseis acquisition system 8 in accordance with embodiments of the invention includes a surface-located seismic vibrator 10; surface-located geophones $D_1$, $D_2$, $D_3$ and $D_4$; and a data acquisition system 14. To perform a vibroseis survey, the seismic vibrator 10 generates a seismic source signal 15 for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$; respectively. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the seismic source signal 15, the seismic vibrator 10 contains an hydraulic actuator that drives a vibrating element 11 in response to a driving signal (called "DF(t)"). More specifically, the driving signal $DF(t)$ may be a sinusoid whose amplitude and frequency are changed during the sweep, as further discussed below. Because the vibrating element 11 is coupled to a base plate 12 that is in contact with the earth surface 16, the energy from the element 11 is coupled to the earth to produce the seismic source signal 15.

It is noted that in accordance with other embodiments of the invention, the vibrating element 11 may be driven by an actuator other than a hydraulic actuator. For example, in accordance with other embodiments of the invention, the vibrating element 11 may be driven by an electro-magnetic actuator. Additionally, in accordance with other embodiments of the invention, the seismic vibrator 10 may be located in a borehole and thus, may not be located at the surface. In accordance with some embodiments of the invention, seismic sensors, such as geophones, may alternatively be located in a borehole. Therefore, although specific examples of surface-located seismic vibrators and seismic sensors are set forth herein, it is understood that the seismic sensors, the seismic vibrator or both of these entities may be located downhole depending on the particular embodiments of invention. Thus, many variations are contemplated and are within the scope of the appended claims.

Among its other features, the seismic vibrator 10 may include a signal measuring apparatus 13, which includes sensors (accelerometers, for example) to measure the seismic source signal 15 (i.e., to measure the output force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled the driving signal DF(t): the frequency of the driving signal DF(t) sets the frequency of oscillation of the reaction mass; and the amplitude of the oscillation, in general, is controlled by a magnitude of the driving signal DF(t). During the sweep, the frequency of the driving signal DF(t) transitions (and thus, the oscillation frequency of the reaction mass transitions) over a range of frequencies, one frequency at time. The amplitude of the driving signal DF(t) is also varied during the sweep pursuant to a designed amplitude-time envelope, as further described below. The maximum force profile may be a function of the physical constraints that are imposed by the seismic vibrator, as well as constraints that are imposed by geophysical properties of the earth.

Better survey results typically are obtained by maximizing the energy that the seismic vibrator 10 injects into the earth, which means that optimal results typically are obtained, in general, by maximizing the force that is generated by the oscillating reaction mass. In general, a larger amplitude of oscillation for the reaction mass is required at the lower end of the frequency range to deliver the same force as the force delivered for a smaller amplitude of oscillation at the higher end of the frequency range. However, the seismic vibrator 10 has physical limitations, which control the maximum displacement of the reaction mass. The limitations on the maximum displacement vary with frequency. Because the displacement of the reaction mass is a function of the driving signal DF(t), the above-described physical limitations of the seismic vibrator 10 establish a maximum driving force versus frequency profile (herein called a "maximum force profile") for the vibrator 10.

More specifically, for a given oscillation frequency, the seismic vibrator 10 has an associated limiting driving force: the driving force that maximizes the output force of the vibrator 10 while maintaining a harmonic content of the output force at or below an acceptable level. Thus, a driving force above the limiting driving force produces no increase in the output force, produces an output force that has an unacceptable level of harmonic distortion, and/or produces an output force that is otherwise less than optimum. The limiting driving forces for the different frequencies collectively form the maximum force profile, which, as described further below, may be used to design the parameters of the driving signal DF(t) for a vibroseis sweep.

Figure 2:
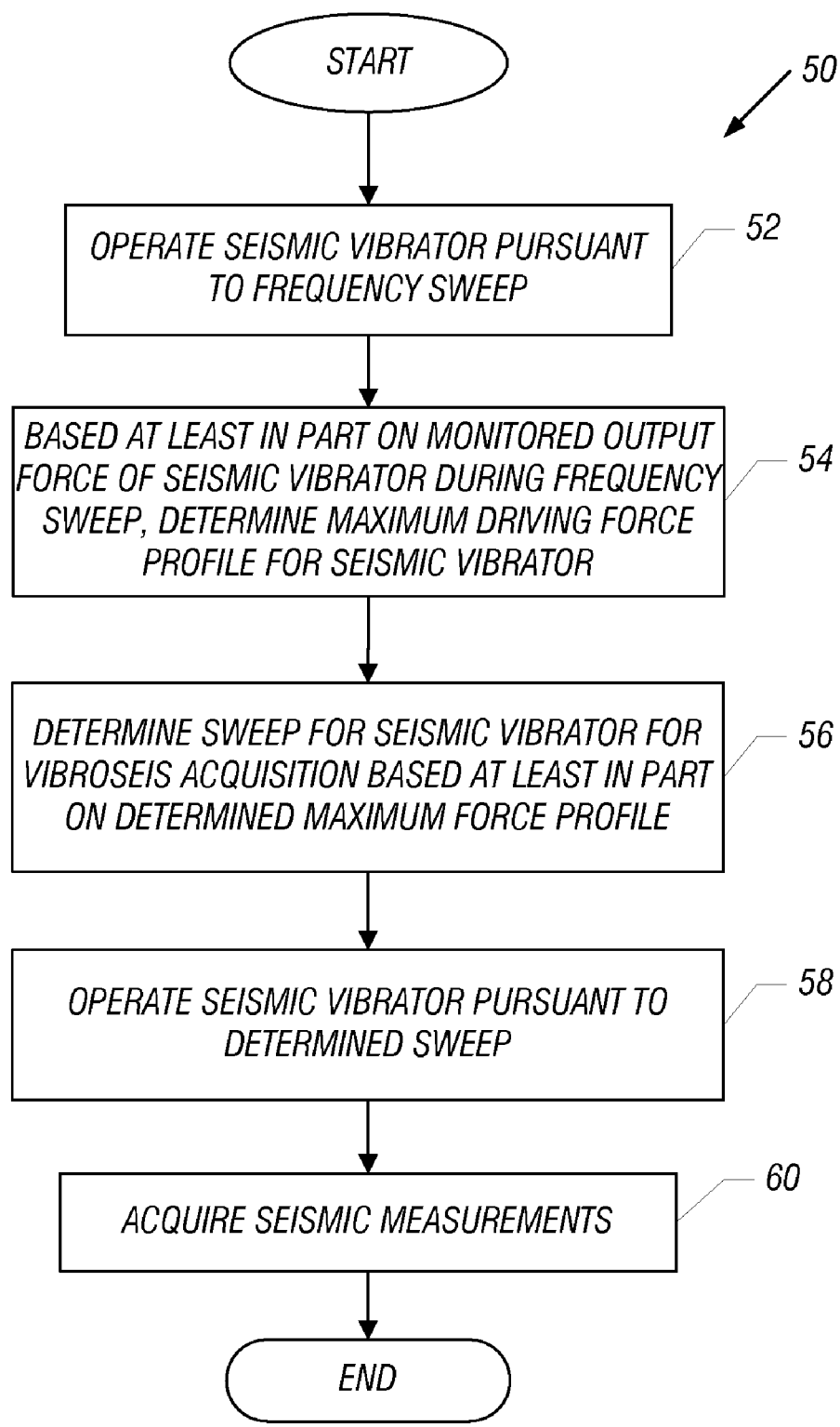
FIG. 2 is a flow diagram depicting a technique to calibrate a seismic vibrator and operate the seismic vibrator in connection with a vibroseis acquisition according to an embodiment of the invention.

Techniques and systems are described herein for purposes of empirically determining the maximum force profile for the seismic vibrator 10. More specifically, FIG. 2 depicts an exemplary technique 50 for determining the maximum force profile and using this force profile to acquire seismic data in connection with a vibroseis acquisition, in accordance with some embodiments of the invention. Pursuant to the technique 50, a seismic vibrator is operated (block 52) one frequency at a time, pursuant to a frequency sweep. In this regard, the frequency sweep may involve operating the seismic vibrator at monotonically increasing or decreasing frequencies. It is noted that although an example of an operation that involves a monotonically increasing frequency is described, the frequencies may be acquired in any order, depending on the particular embodiment of the invention. In this regard, the frequencies may be acquired sequentially, non-sequentially, in an increasing fashion or in a decreasing fashion, as there is absolute requirement for a particular order. Furthermore, the frequencies may be linearly related or may be non-linear with respect to each other, depending on the particular embodiment of the invention. Regardless of the form of the particular frequency sweep, however, the technique 50 involves determining the limiting driving force for each frequency.

More specifically, during the frequency sweep, based at least in part on a parameter that is affected by operation of the seismic vibrator, such as the output force, a maximum force profile for the seismic vibrator is determined, pursuant to block 54. Parameters other than the output force may be monitored for purposes of determining the maximum driving force profile, such as a value indicated by a control system for the seismic vibrator, an error flag status or a harmonic distortion level. It is assumed herein that unless otherwise noted the output force is monitored and used to derive the maximum driving force profile. However, the maximum driving force profile may be derived based at least in part on other parameters, depending on the particular embodiment of the invention.

The output force of the seismic vibrator may be monitored via onboard sensors (such as accelerometers, for example) of the seismic vibrator 10 and/or may be monitored by external sensors and measurement apparatus, as just a few examples. Using the maximum driving force profile, a sweep for vibroseis acquisition may then be determined, pursuant to block 56. As a more specific example, a driving force signal DF(t) based on the determined maximum force profile may be designed, as further described below. Subsequently, the seismic vibrator may be operated (block 58) in response to the driving force signal DF(t) for purposes of acquiring seismic measurements, pursuant to block 60.

Because the determined maximum force profile may be a function of the physical constraints that are imposed by the seismic vibrator, as well as constraints that are imposed by geophysical properties of the earth, the determined maximum force profile may or may not be re-used for a different survey location. Thus, the ability to re-use the determined maximum force profile depends on the similarity of the geophysical properties of the new location versus the geophysical properties of the original location where the maximum force profile was determined.

Figure 3:
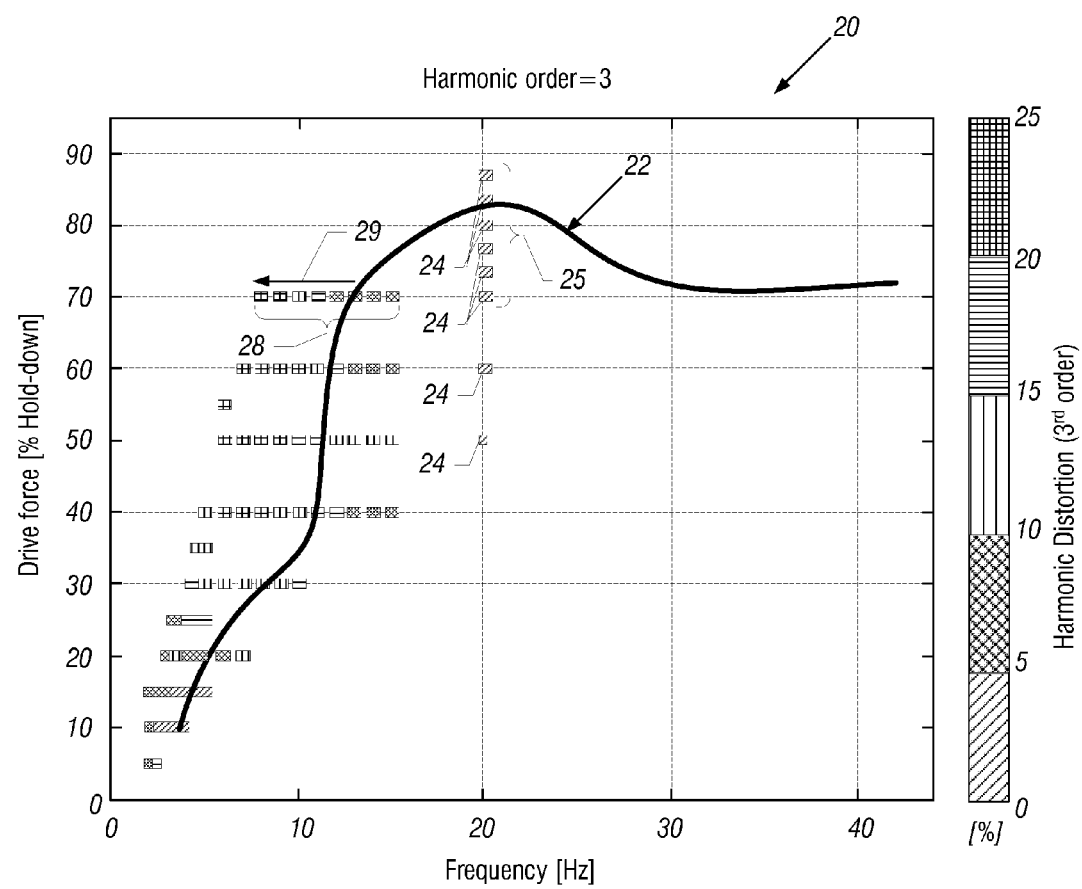
FIG. 3 illustrates empirical derivation of a maximum driving force profile for a seismic vibrator according to an embodiment of the invention.

As an example, FIG. 3 is an illustration 20 of an exemplary derivation of a maximum force profile 22 in accordance with some embodiments of the invention. For this derivation, the seismic vibrator is operated, one frequency at a time, pursuant to a frequency sweep that spans from approximately 3 Hertz (Hz) to approximately 42 Hz. The frequencies in the sweep are non-linearly or linearly incremented, and for each frequency, the seismic vibrator is operated at progressively increasing driving forces for purposes of determining the limiting driving force for the particular frequency. In generally, the frequencies may be incremented by smaller amounts for the lower frequencies and larger amounts for the higher frequencies. For example, the frequencies may be incremented by 0.5 Hz from 3 Hz to 5 Hz, incremented by 1 Hz from 5 Hz to 15 Hz and thereafter incremented by larger amounts for frequencies over 15 Hz.

As a more specific example, FIG. 3 depicts progressively increasing the driving forces 24 for a frequency of 20 Hz. As the driving forces 24 increase, eventually, the capabilities of the seismic vibrator are reached. More specifically, the increasing driving forces 24 approach and exceed the profile 22: a driving force 24 below the profile 22 is not maximized in that a larger driving force 24 produces a larger output force; and a driving force 24 above the profile 22 produces an output force that has an acceptable level of harmonic distortion, an output force that does not exceed the output force produced by the driving force at the profile and/or an output force that is not otherwise optimized, as indicated by the monitored output force. As shown in FIG. 3, the limiting driving force at 20 Hz is about 82 percent of the hold-down force.

As mentioned above, in accordance with embodiments of the invention, harmonic distortion may be considered for purposes of evaluating the maximum driving force for a particular frequency. As a more specific example, third order harmonic distortion may be considered in accordance with some embodiments of the invention for purposes of determining the limiting driving force. As graphically depicted in FIG. 3 for harmonic distortion measurements 28 at a particular driving force, the harmonic distortion generally increases (as indicated by arrow 29) as the frequency decreases. Other spectral components of the output force, other than the third harmonic component, may be monitored and used as bases for determining the limiting driving force for a particular frequency, in accordance with other embodiments of the invention.

In accordance with some embodiments of the invention, the range of driving forces that are tested for a given frequency may be determined based on an expected limiting driving force for the frequency. For example, in accordance with some embodiments of the invention, the limiting driving force that is determined for an adjacent frequency may be used as a gauge to predict an expected limiting driving force for the current frequency being evaluated. In this regard, the range of driving forces for the current frequency may be defined by predefined percentages above and below the expected limiting driving force value.

As a more specific example, in accordance with some embodiments of the invention, the range of driving forces may span between −15% to +5% of the expected limiting driving force. Thus, if at a frequency of 6 Hz, a limiting force is encountered at 50% of the hold-down value, then the force range for which data is required at 6.5 Hz (the next frequency in the frequency sweep) contains driving forces of 35%, 40%, 45%, 50% and 55% of the hold-down value.

Alternatively, in accordance with other embodiments of the invention, systematic testing of a wider range of parameter combinations may be performed to bracket the maximum force profile, allowing subsequent tests (such as tests on different ground conditions, for example) to be specified relative to the initial results.

The increments between driving force levels being tested may be decreased to "fine tune" the determination of the limiting driving force after "coarse tuning" identifies the limiting driving force with less precision. For example, as depicted in FIG. 3, the driving forces 24 may be incremented by 10% of the hold-down force until a coarse approximation of the limiting driving force is obtained. Thereafter, the driving forces 24 are progressively increased at relatively similar increments over a range 25 that spans across the coarsely determined limiting driving force.

Figure 4:
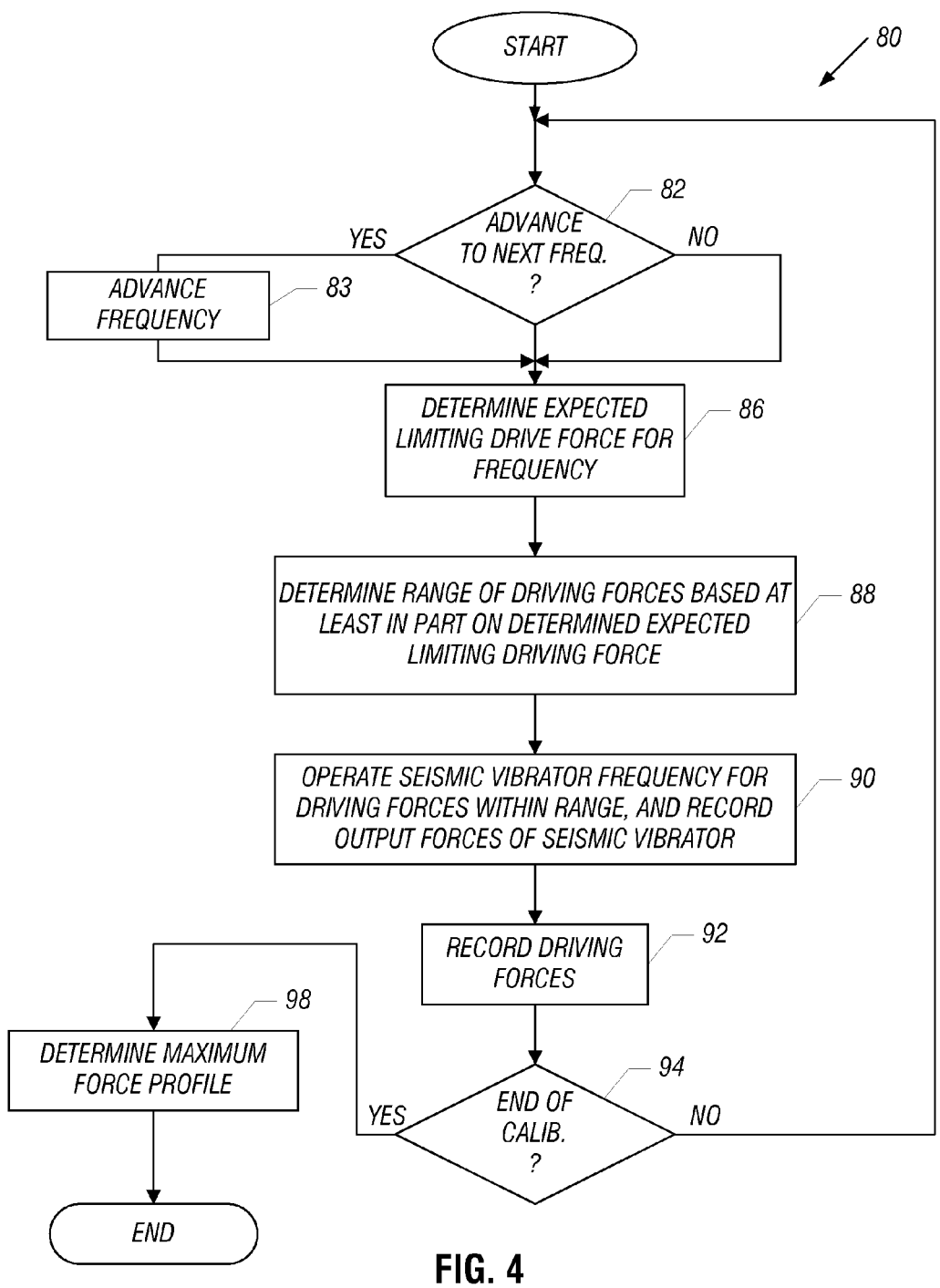
FIGS. 4, 6 and 7 are flow diagrams depicting techniques to determine a maximum driving force profile for a seismic vibrator according to embodiments of the invention.

Referring to FIG. 4, thus, in accordance with some embodiments of the invention, a technique 80 to determine a maximum force profile for the seismic vibrator includes determining (pursuant to diamond 82) whether the frequency sweep is to be advanced to the next frequency. If so, then the sweep is advanced to the next frequency pursuant to block 84 and then, the expected limiting driving force for this frequency is determined, pursuant to block 86. Based on the determined expected limiting driving force, a range of driving forces is determined, pursuant to block 88.

The seismic vibrator is then operated at the particular frequency for the range of driving forces, and the output forces of the seismic vibrator are recorded, pursuant to block 92. It is noted that during the recordation of the output forces, a dynamic determination may be made as to the limiting driving force for that frequency. If the calibration continues (diamond 94), then control returns to diamond 82 for purposes of advancing to the next frequency. It is noted that the above-described loop may be repeated several times at the same frequency for purposes of optimally adjusting the driving forces to improve the resolution of the limiting driving force determination.

At the end of the calibration, the maximum force profile may be determined, pursuant to block 98. It is noted that the limiting driving forces may be determined after the frequency sweep or during the frequency sweep, depending on the particular embodiment of the invention.

As discussed above, one application of the maximum force profile is the generation of a vibroseis sweep that is optimized to maximize the low frequency energy that is injected into the earth. As a more specific example, assume that the maximum driving force in the frequency domain is represented by "DF (f)," and the desired energy spectral density to be injected into the ground is represented by "esd(f)." The sweep rate (called "SR(f)") may then be determined according to the following equation:

$$SR(f) = 4\frac{esd(f)}{DF^2(f)}. \qquad \text{Eq. 1}$$

From Eq. 1, the times at which the instantaneous frequency (called "$f_i$") is put into the ground may be determined, as described below:

$$t_i(f_i) = \int_{f_{min}}^{f_i} SR(f) df, \qquad \text{Eq. 2}$$

where "$f_{min}$" represents the minimum frequency of interest, and "$t_i(f_i)$" represents a monotonic function of $f_i$ that may be numerically inverted to obtain the time dependent instantaneous frequency that is put into the ground, or "$\hat{f}_i(t)$." The sweep amplitudes for the driving force signal DF(t) may be determined, as described below:

$$\alpha(t) = DF(\hat{f}_i(t))\sin(2\pi\int_0^t \hat{f}_i(t)dt + \alpha), \qquad \text{Eq. 3}$$

wherein "α" represents a user-defined initial phase.

More details regarding the use of the maximum force profile to derive the vibroseis sweep may be found in U.S. Patent Application Publication No. 2007/0133354A1, entitled, "SYSTEMS AND METHODS FOR ENHANCING LOW-FREQUENCY CONTENT IN VIBROSEIS ACQUISITION," which published on Jun. 14, 2007, and is hereby incorporated by reference in its entirety.

In accordance with some embodiments of the invention, the seismic vibrator may be operated to transmit to the Earth's interior a ground-force whose fundamental component envelope substantially resembles the maximum driving force profile. The fundamental component of the ground-force is the component of the total ground-force whose instantaneous frequency as function of time coincides with that of the desired (pilot) instantaneous frequency. If the fundamental force is subtracted from the total ground force, the remaining signal is the noise (harmonic and any other type) generated by the vibrator.

Figure 5:
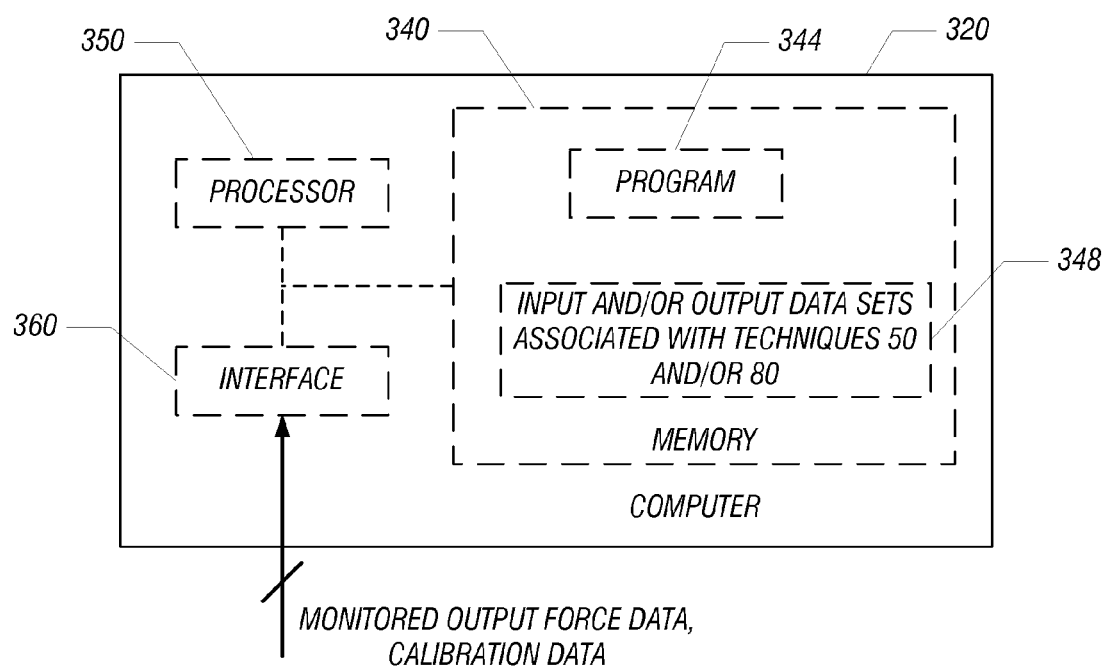
FIG. 5 is a schematic diagram of a processing system according to an embodiment of the invention.

Referring to FIG. 5, in accordance with some embodiments of the invention, a processing system 320 may perform at least some of the techniques that are disclosed herein for such purposes of operating the seismic vibrator during the determination of the maximum force profile, determining the maximum force profile based on the monitored output forces, determining the parameters of the driving force signal DF(t) for a sweep, and/or operating the seismic vibrator to perform a vibroseis acquisition, as just a few examples. The system 320 may be located on the seismic vibrator, on a surface acquisition system, at remote locations, etc. In accordance with some embodiments of the invention, the system 320 may include a processor 350, such as one or more microprocessors and/or microcontrollers.

The processor 350 may be coupled to a communication interface 360 for purposes of receiving data that corresponds to measurements of the output force of the seismic vibrator and/or calibration data that indicates a maximum force profile. Thus, in accordance with embodiments of the invention described herein, the processor 350, when executing instructions stored in a memory of the seismic data processing system 320, may receive output force data.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques 50 and/or 80, as indicated by reference numeral 348. The memory 340 may store program instructions 344, which when executed by the processor 350, may cause the processor 350 to perform one or more of the techniques that are disclosed herein, such as the techniques 50 and/or 80 and display results obtained via the technique(s) on a display (not shown in FIG. 5) of the system 320, in accordance with some embodiments of the invention.

Figure 6:
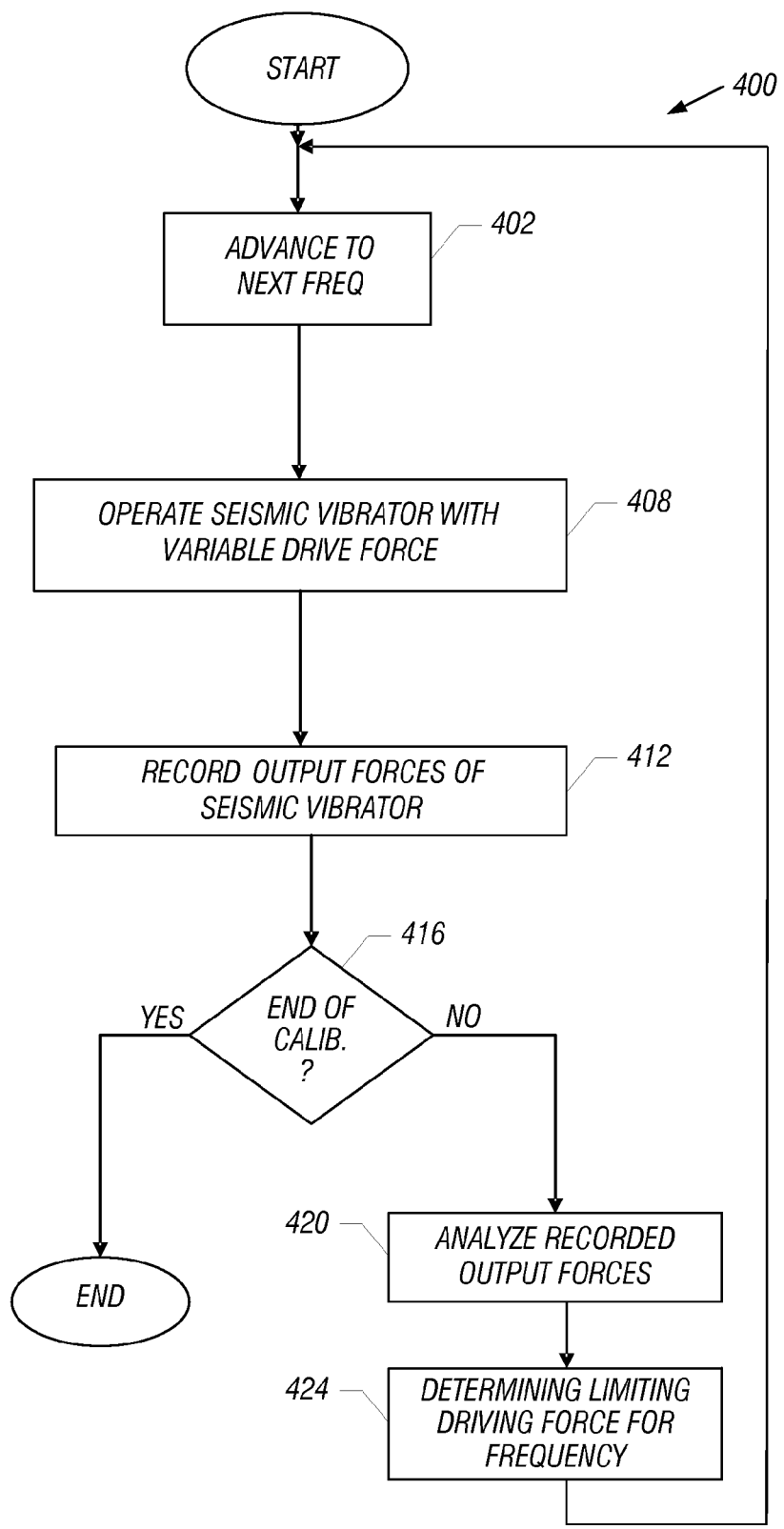

Other embodiments are contemplated and are within the scope of the appended claims. For example, referring to FIG. 6, in accordance with other embodiments of the invention, a technique 400 may be used for purposes of determining a maximum force profile by, at each frequency, driving the seismic vibrator with a variable drive force and analyzing the corresponding output force that is produced by the vibrator regardless of the harmonic distortion that is present in the monitored output force. More specifically, pursuant to the technique 400, an advance is made to the next frequency, pursuant to block 402, and the seismic vibrator is operated (block 408) with a variable drive force. Thus, unlike the techniques discussed above, the seismic vibrator is driven with the predetermined variable drive force, regardless of the harmonic distortion. The output force of the seismic vibrator is recorded (block 412), and if additional frequencies remain in the frequency sweep (as determined in diamond 416), the technique 400 returns to block 402. Otherwise, the recorded output forces for each frequency are analyzed (block 420) to determine (block 424) a limiting driving force for that frequency. For example, some property (spectral content, average force, amplitude-time envelope, etc.) of the monitored output forces for each frequency may be determined and compared to predetermined patterns associated with predetermined limiting driving forces to determine the limiting driving force for that frequency. The monitored output forces may be analyzed in other ways in other embodiments of the invention.

Figure 7:
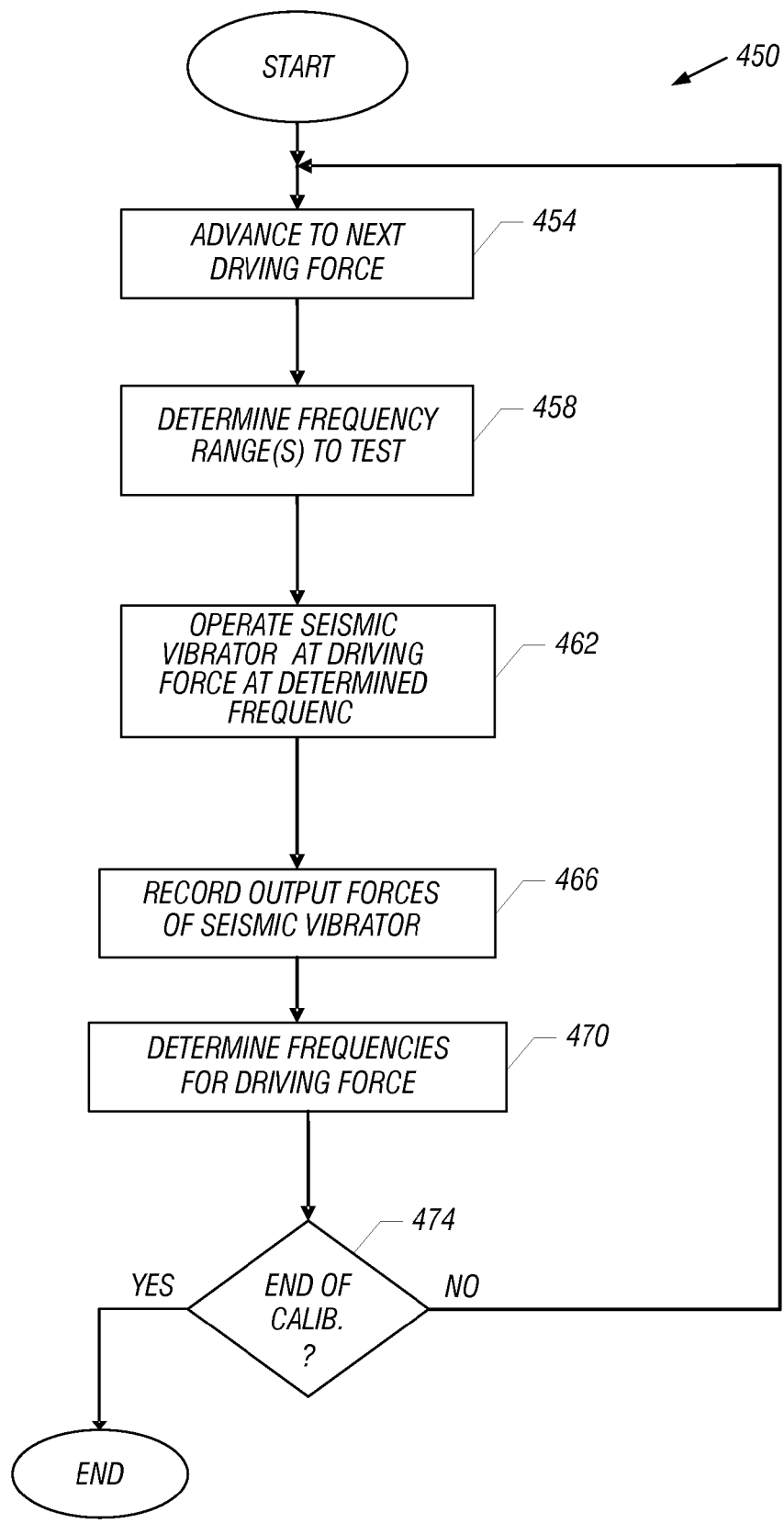

As an example of yet another embodiment of the invention, instead of performing a frequency sweep to determine the maximum force profile, the driving forces may be swept. In this regard, referring to FIG. 7, a technique 450 determines the frequencies that can be driven for each given driving force by driving the seismic vibrator at the driving force for a narrow frequency range. More specifically, in accordance with some embodiments of the invention, the technique 450 includes pursuant to the driving force sweep, advancing (block 454) to the next driving force and at the next driving force, determining a particular frequency range or ranges to test, pursuant to block 458. The seismic vibrator is then operated at the current driving force, pursuant to block 462, at the determined frequency range(s). The corresponding output forces that are produced by the seismic vibrator are then recorded (block 466), and based on the recorded output forces, a determination is made, pursuant to block 470, regarding the frequencies to be associated with the particular driving force being tested in the maximum force profile. In this regard, several overlapping frequency ranges may be tested for purposes of selecting and/or eliminating the frequency ranges to derive the frequencies to be assigned in the maximum force profile for that particular driving force level. Assuming that calibration has not ended (diamond 474), control returns to block 454 for the next driving force level.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method, implemented with a processor, comprising:
   operating a seismic vibrator, comprising:
      driving the seismic vibrator at different frequencies; and
      for each of the frequencies, driving the seismic vibrator at a plurality of driving forces over a range of the driving forces;
   monitoring a parameter affected by the operation of the seismic vibrator;
   based at least in part on the monitored parameter, determining a maximum driving force profile for the seismic vibrator; and
   regulating the range of the driving forces for each frequency of the frequencies based at least in part on results obtained from an ongoing progress of the maximum driving force profile determination.

2. The method of claim 1, wherein the act of monitoring the parameter comprises monitoring an output force of the seismic vibrator.

3. The method of claim 1, wherein the operating comprises:
   driving the seismic vibrator at the different frequencies pursuant to a frequency sweep.

4. The method of claim 3, wherein the operating comprises:
   for each frequency, determining a limiting driving force of the vibrator at the frequency.

5. The method of claim 4, wherein the act of determining the limiting drive force comprises:
   for each frequency, driving the seismic vibrator at different driving forces pursuant to a driving force sweep.

6. The method of claim 5, wherein the act of driving the seismic vibrator pursuant to a driving force sweep for each frequency comprises selecting a range of the driving forces based at least in part on an expected limiting driving force for the frequency.

7. The method of claim 6, further comprising:
determining the expected limiting drive force for the frequency based on the limiting drive force determined for another frequency.

8. The method of claim 1, further comprising:
determining a sweep for the seismic vibrator for vibroseis acquisition based at least in part on the determined maximum driving force profile.

9. The method of claim 8, further comprising:
operating the seismic vibrator pursuant to the determined sweep; and
acquiring seismic measurements in response to the operation of the seismic vibrator pursuant to the determined sweep.

10. The method of claim 1, wherein
the operating comprises driving the seismic vibrator at the different driving forces pursuant to a driving force sweep; and
the determining comprises associating one or more frequencies with each driving force to determine the maximum force profile.

11. The method of claim 1, wherein
the operating comprises driving the seismic vibrator at the different frequencies pursuant to a frequency sweep and for each of the frequencies operating the seismic vibrator in response to a variable driving force,
the monitoring comprises at each frequency, recording an output force generated by the seismic vibrator due to the operation of the seismic vibrator with the variable driving force; and
the determining comprises determining a limiting driving force for each frequency based on an analysis of the recorded output force.

12. The method of claim 1, wherein the operating comprises operating the vibrator to transmit to the Earth's interior a ground-force whose fundamental component envelope substantially resembles the maximum driving force profile.

13. A method, implemented with a processor, comprising:
operating a seismic vibrator, comprising:
driving the seismic vibrator at different frequencies; and
for each of the frequencies, driving the seismic vibrator at a plurality of driving forces over a range of the driving forces;
monitoring a parameter affected by the operation of the seismic vibrator;
based at least in part on the monitored parameter, determining a maximum driving force profile for the seismic vibrator; and
regulating the range of the driving forces for each frequency of the frequencies, the regulating comprising:
selecting an upper end of the range based on a first predetermined percentage of an expected limited driving force; and
selecting a lower end of the range based on a second predetermined percentage of the expected limited driving force.

14. The method of claim 13, wherein the first and second predetermined percentages are different.

15. The method of claim 13, wherein the first predetermined percentage comprises approximately five percent and the second predetermined percentage comprises approximately fifteen percent.

16. An article comprising a computer readable storage medium to store instructions that when executed by a processor-based system cause the processor-based system to:
operate a seismic vibrator by driving the seismic vibrator at different frequencies and for each of the frequencies, driving the seismic vibrator at a plurality of driving forces over a range of the driving forces;
monitor a parameter affected by the operation of the seismic vibrator;
based at least in part on the monitored parameter, determine a maximum driving force profile for the seismic vibrator; and
regulate the range of the driving forces for each frequency of the frequencies based at least in part on results obtained from an ongoing progress of the maximum driving force profile determination.

* * * * *